United States Patent [19]

Akemura

[11] Patent Number: 5,571,426

[45] Date of Patent: Nov. 5, 1996

[54] METHOD OF DETERMINING ELECTRIC DISCHARGE MACHINING CONDITIONS AND ELECTRIC DISCHARGE MACHINING CONTROLLER

[75] Inventor: Osamu Akemura, Nakamachidai, Japan

[73] Assignee: Sodick Co., Ltd., Kanagawa, Japan

[21] Appl. No.: 360,419

[22] Filed: Dec. 21, 1994

[30] Foreign Application Priority Data

Dec. 22, 1993 [JP] Japan .................................. 5-345596

[51] Int. Cl.$^6$ ..................................................... B23H 1/02
[52] U.S. Cl. ................................... 219/69.17; 219/69.13; 395/904
[58] Field of Search ............................. 219/69.13, 69.16, 219/69.17, 69.18; 364/474.04, 152; 395/21, 22, 904

[56] References Cited

U.S. PATENT DOCUMENTS

| | | | |
|---|---|---|---|
| 4,952,790 | 8/1990 | Futamura | 219/69.13 |
| 5,091,620 | 2/1992 | Mohri et al. | 219/69.13 |
| 5,200,905 | 4/1993 | Uemoto et al. | 219/69.13 |
| 5,216,218 | 6/1993 | Sasaki | 219/69.13 |
| 5,267,141 | 11/1993 | Morita et al. | 364/152 |
| 5,428,201 | 6/1995 | Kaneko et al. | 219/69.13 |

FOREIGN PATENT DOCUMENTS

| | | | |
|---|---|---|---|
| 05505570 | 9/1991 | European Pat. Off. | |
| 61-103736 | 5/1986 | Japan | |
| 61-146420 | 7/1986 | Japan | |
| 1-153221 | 6/1989 | Japan | |
| 2-218517 | 8/1990 | Japan | 219/69.17 |
| 3-136725 | 6/1991 | Japan | 219/69.17 |
| 4183525 | 6/1992 | Japan | 219/69.13 |

*Primary Examiner*—Geoffrey S. Evans
*Attorney, Agent, or Firm*—McDermott, Will & Emery

[57] ABSTRACT

A method of determining electric discharge machining conditions comprises the steps of establishing multiple sets of predefined machining parameters, establishing for each set of predefined machining parameters a set of basic machining data indicating relationships present during electric discharge machining among electric discharge machining current, machining depth and minimum electrode side surface undersize, selecting at least two sets of basic machining data from among the multiple sets thereof in accordance with a given set of predefined machining parameters, and inferring and thereupon generating machining condition data representing a series of pairs of values comprising machining depth values and corresponding electric discharge machining current values for machining the workpiece to a prescribed configuration and prescribed dimensions, the electric discharge machining current values in the series progressively changes with increasing machining depth value from a value larger than the electric discharge machining current of the selected set of basic machining data to a value smaller than the electric discharge machining current of the selected set of basic machining data.

18 Claims, 15 Drawing Sheets

FIG. 3

MACHINING AREA : 50 mm²

| IP VALUE | 25.0 | 20.0 | 15.0 | 10.0 | 5.0 | 3.0 | ..... |
|---|---|---|---|---|---|---|---|
| BOTTOM SURFACE REMAINDER | 900 | 750 | 640 | 420 | 225 | 85 | ..... |
| SIDE SURFACE REMAINDER | 540 | 470 | 400 | 320 | 210 | 80 | ..... |
| DEPTH (mm) | MINIMUM SIDE SURFACE UNDERSIZE (PER SIDE) | | | | | | |
| 1 | 450 | 370 | 310 | 250 | 198 | 75 | ..... |
| 5 | 500 | 430 | 380 | 300 | 220 | 110 | ..... |
| 10 | 570 | 480 | 420 | 350 | 250 | 150 | ..... |
| 20 | 660 | 590 | 510 | 420 | 295 | 170 | ..... |
| 30 | 720 | 620 | 550 | 460 | 320 | 200 | ..... |
| 50 | 800 | 720 | 610 | 490 | 360 |  | ..... |

FIG.4

MACHINING AREA : 100 mm²

| IP VALUE | 25.0 | 20.0 | 15.0 | 10.0 | 5.0 | ----- |
|---|---|---|---|---|---|---|
| BOTTOM SURFACE REMAINDER | 850 | 730 | 610 | 400 | 210 | ----- |
| SIDE SURFACE REMAINDER | 500 | 430 | 380 | 270 | 190 | ----- |
| DEPTH (mm) | MINIMUM SIDE SURFACE UNDERSIZE (PER SIDE) | | | | | |
| 1 | 450 | 370 | 300 | 240 | 190 | ----- |
| 5 | 500 | 460 | 350 | 290 | 210 | ----- |
| 10 | 550 | 500 | 400 | 330 | 240 | ----- |
| 20 | 600 | 570 | 480 | 360 | 275 | ----- |
| 30 | 660 | 600 | 530 | 400 | 310 | ----- |
| 50 | 720 | 630 | 570 | 430 | 355 | ----- |

METHOD OF DETERMINING ELECTRIC DISCHARGE MACHINING CONDITIONS AND ELECTRIC DISCHARGE MACHINING CONTROLLER

BACKGROUND OF THE INVENTION

1. Field of the Invention

This invention relates to a method of determining the optimum electric discharge machining conditions for a machining electrode and a workpiece based on predefined machining parameters, and an electric discharge machining controller.

2. Description of the Prior Art

Since the electrode used in electric discharge machining machines an area larger than itself (machining overcut), the machining is conducted using an undersized electrode fabricated to a smaller size than that of the machining dimensions required by the workpiece. As electric discharge machining is more time consuming than other machining methods, it is generally divided into a number of stages between roughing and finishing so as to increase machining efficiency. In the first stage, machining is conducted under rough conditions for approximately obtaining the desired machined configuration. This is known as roughing. In the next stage or stages, called semifinishing, the machining current is reduced and relative movement between the electrode and the workpiece is effected. Finally, finishing is conducted to obtain the required machining dimensions and degree of machined surface roughness.

In determining the roughing conditions in the initial roughing stage, the operator adopts the maximum machining electric current allowable in light of the electrode undersize, machining depth and machining area, and then decides, with reference to a data book or the like, the machining depth and the stock to be left for finishing and required for obtaining the final desired surface roughness.

Among the machining conditions that come into play during roughing, the machining current has the strongest influence on the electric discharge machining overcut and the finishing allowance left for subsequent finishing. The roughing conditions are therefore greatly affected by the amount of electrode undersize. This is because the maximum current usable in roughing is determined almost entirely by the electrode undersize. Therefore, after calculating the maximum permissible machining current from the machining area, the operator checks whether the electrode undersize is sufficiently greater than the machining overcut that can be expected at the calculated machining current value. If it is, roughing is conducted using machining conditions based on the calculated value. If the electrode undersize is smaller than the expected machining overcut, the operation refers to a data book and selects machining conditions which will create a machining overcut that is smaller than the amount of electrode undersize. The general practice in this case is to set the machining current on the low side in consideration of the maximum electric discharge machining overcut, including the machining produced by secondary discharges through the chips (called machining deformation).

This setting of the rough machining current at a relatively low level in light of the anticipated machining overcut and the machining deformation lengthens the time required to complete the roughing operation. Although it is theoretically possible to machine at maximum machining current by using a sufficiently undersized electrode, this method cannot be applied when there are restrictions on the machining configuration or when the electrode has already been fabricated. In such cases there is no alternative but to determine the machining current with reference to the electrode undersize.

SUMMARY OF THE INVENTION

An object of the invention is therefore to provide a method of determining electric discharge machining conditions which minimize the time for roughing operations by reducing the maximum machining current in accordance with the machining depth so as to prevent the maximum machining overcut from increasing during machining to the point where the overcut exceeds the electrode undersize and so as to ensure that the electrode undersize and the maximum machining overcut coincide at the completion of roughing operations.

Another object of the invention is to provide a discharge machining controller for conducting the above method.

In the method according to the invention, the electric discharge machining, particularly roughing operations, is conducted to a prescribed depth using machining conditions which prevent the machining overcut from exceeding the electrode undersize. Specifically, while the machining depth is small, the machining current is set to a large value within a range that does not cause the electric discharge machining overcut to exceed the amount of electrode undersize. Then, as the machining depth increases, the machining current is gradually reduced. Finally, when the machining depth prescribed by the roughing conditions has been reached, the electric discharge machining conditions are set to those for completing the machining in line with the prescribed specifications. As a result, the time required for the machining is reduced.

For conducting this method, the machining area, machining current, electrode undersize, relationship between the machining depth and the maximum machining overcut (including the machining deformation produced by secondary discharges) and other such basic data is stored in memory, pertinent data is retrieved on the basis of machining area, a learning operation is conducted by a neural network or the like, and a series of electric discharge machining conditions are generated by inference.

With this method, the machining conditions which enable the machining current to be applied at the maximum permissible value so as to increase machining efficiency during roughing operations can be easily determined and set.

These and other objects and features of the invention will be more apparent from the following description made with reference to the drawings.

BRIEF EXPLANATION OF THE DRAWINGS

FIGS. 3 and 4 are exemplary tables of basic data stored in a basic data memory of the controller of FIG. 1.

DESCRIPTION OF THE PREFERRED EMBODIMENT

A presently preferred embodiment of the invention will now be explained with reference to the drawings.

Figure 1:
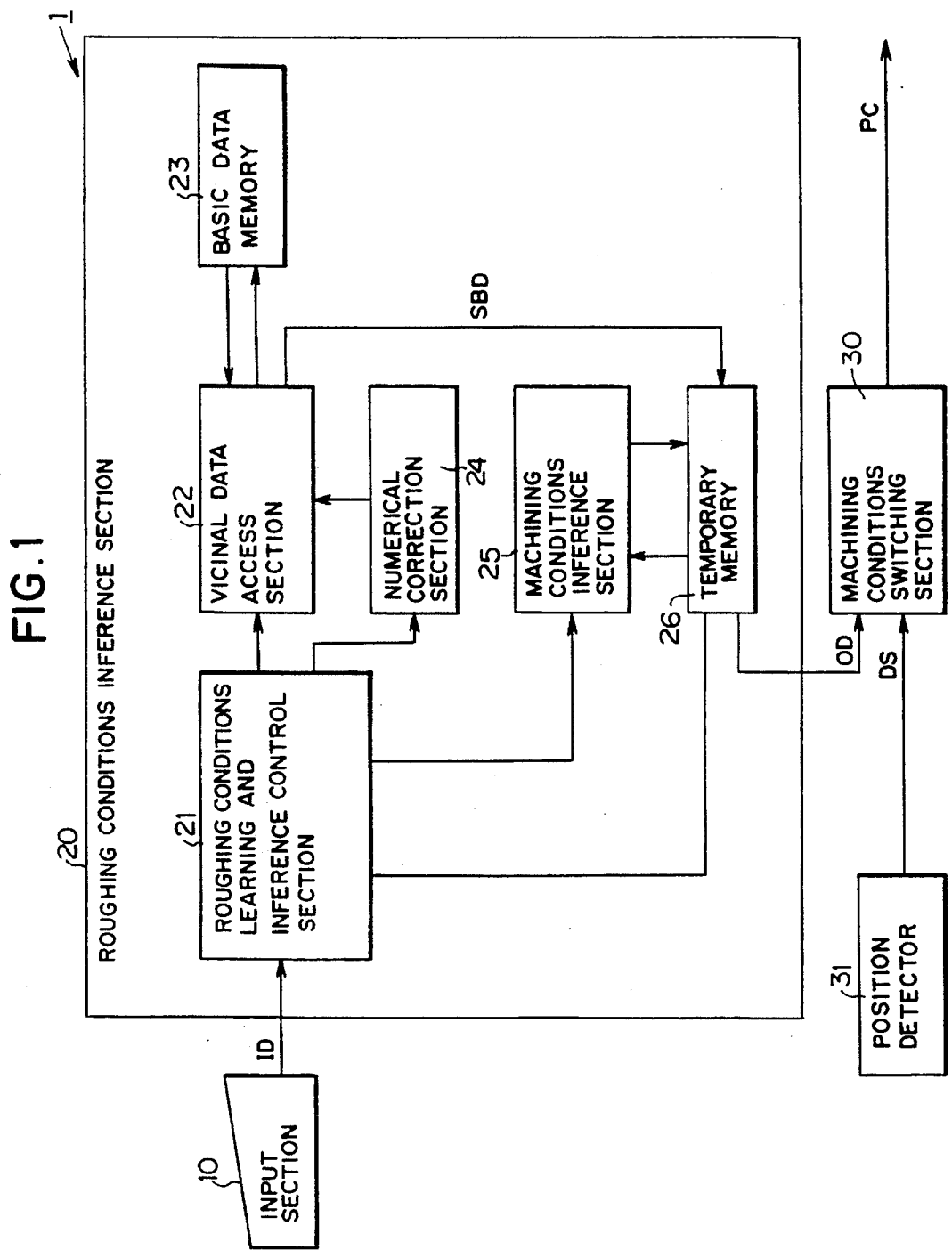
FIG. 1 is a block diagram showing a configuration of an embodiment of the controller according to the present invention.
Figure 2A:
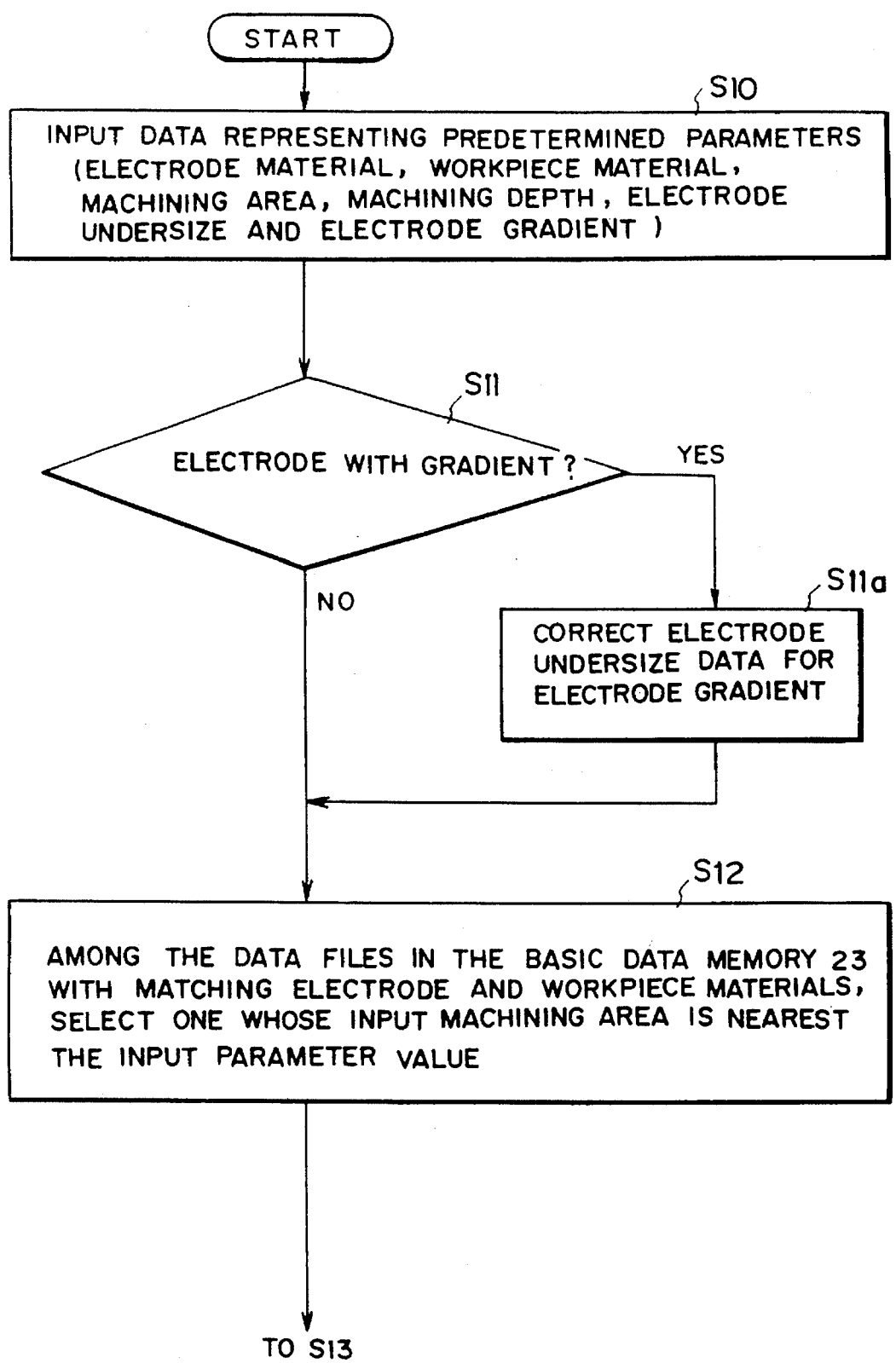
FIGS. 2A to 2F are consecutive portions of a flow chart showing the flow of operations in the controller of FIG. 1.
Figure 2B:
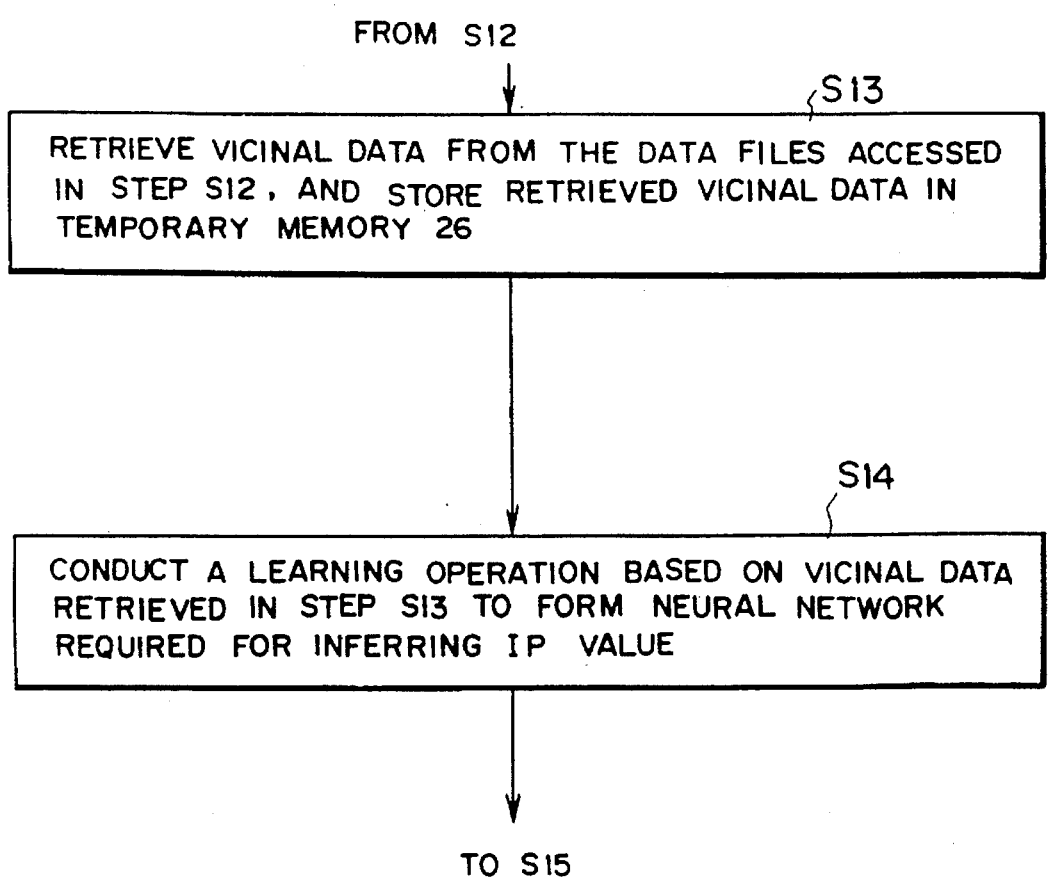
Figure 2C:
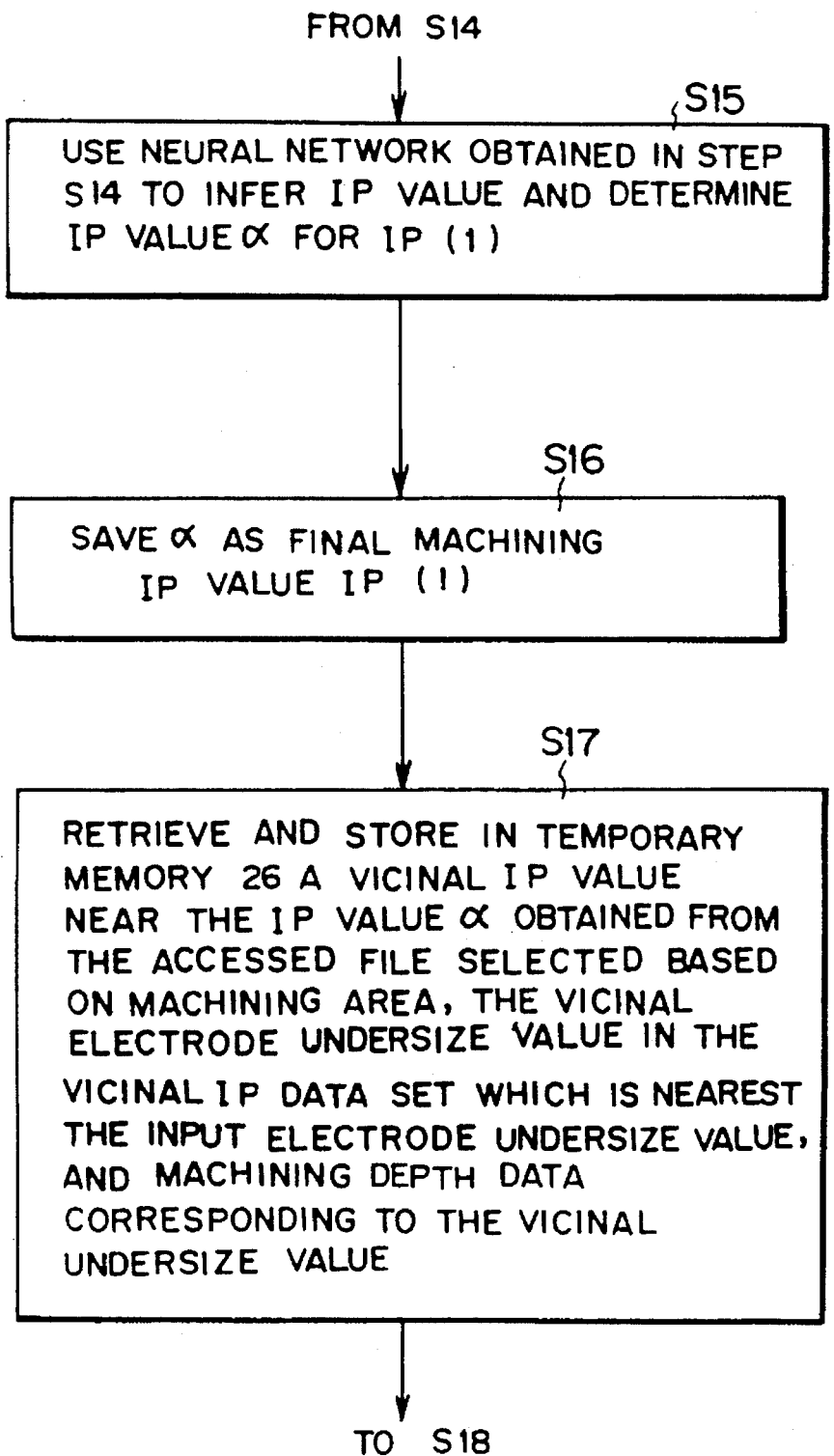
Figure 2D:
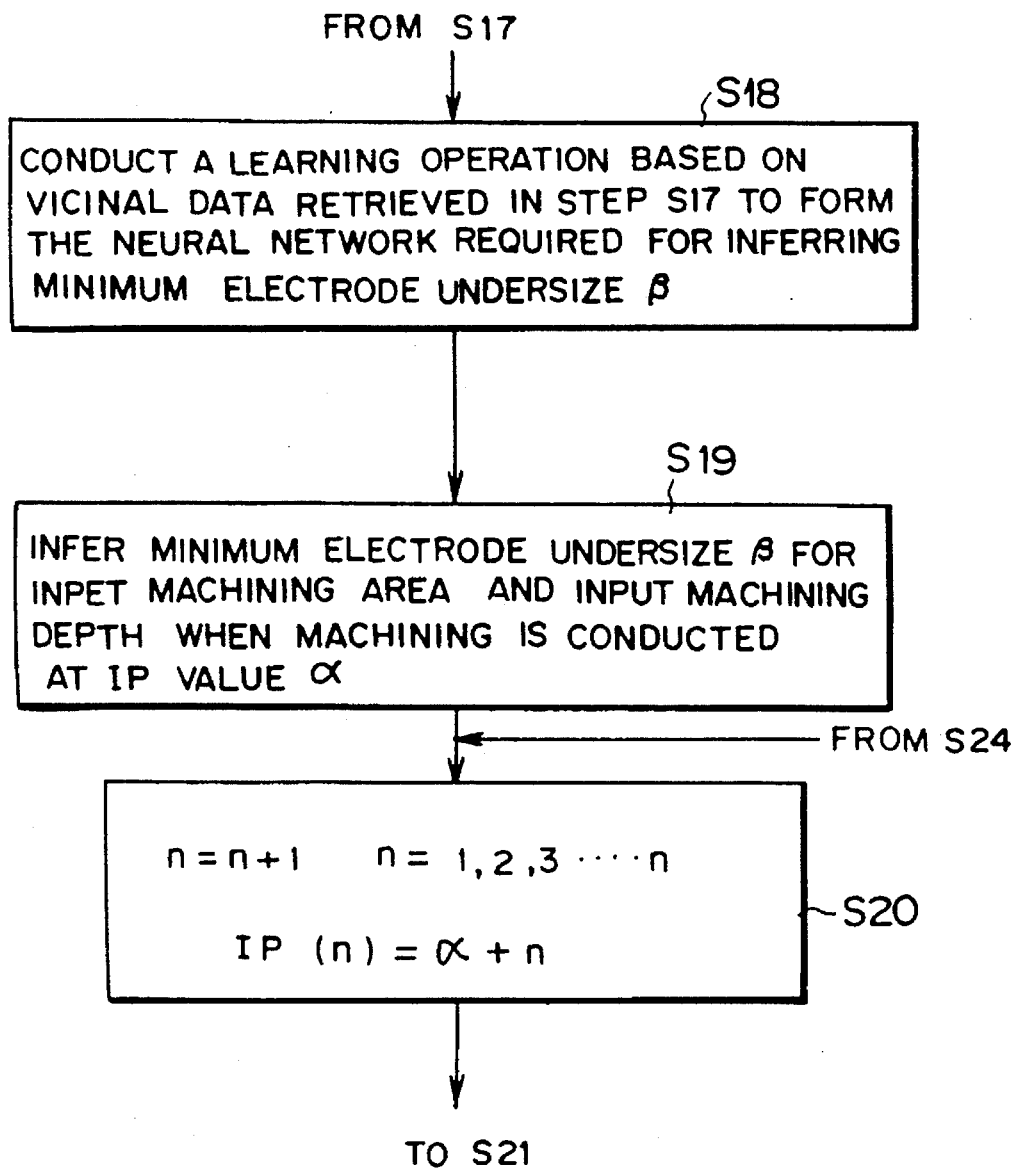
Figure 2E:
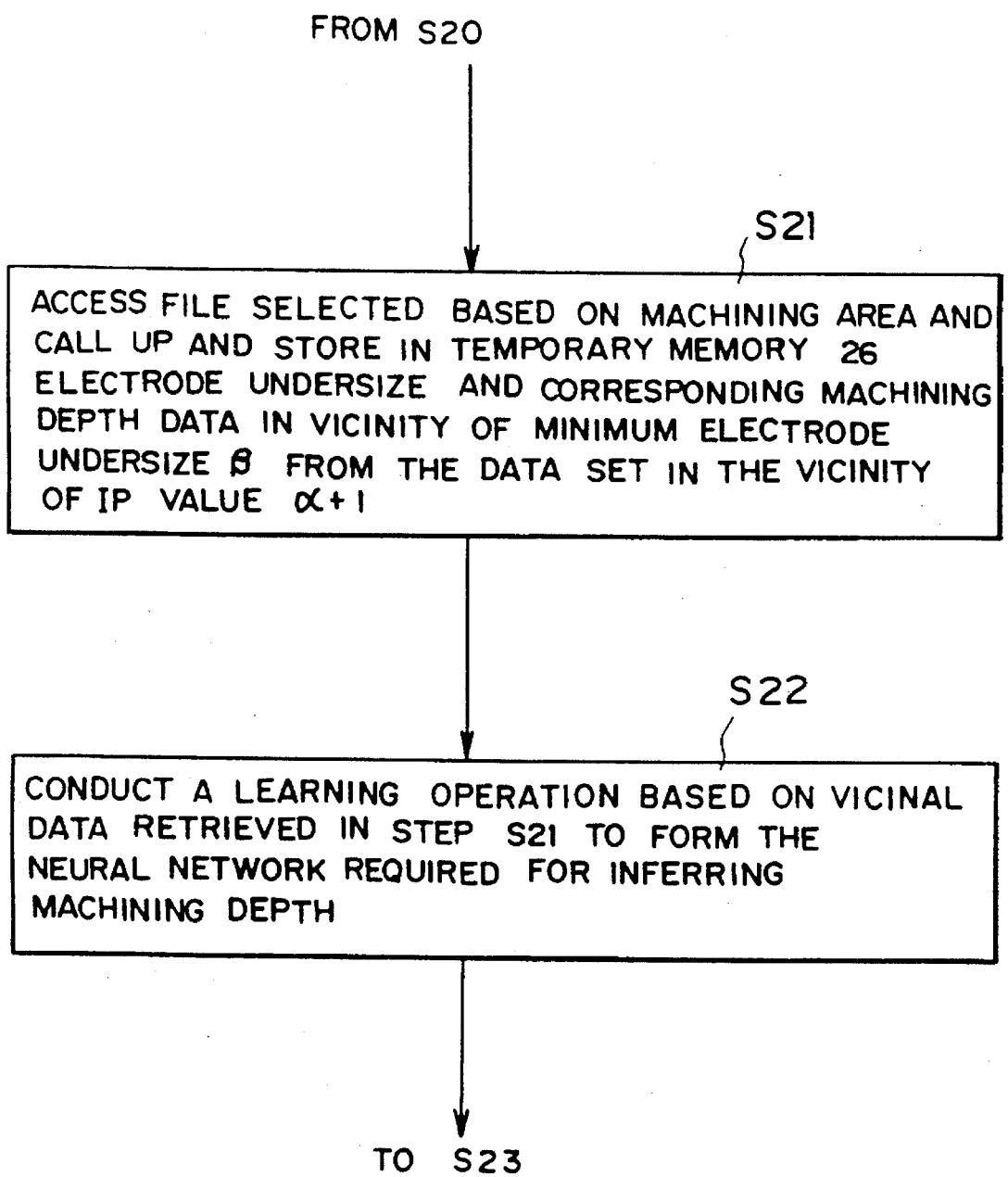
Figure 2F:
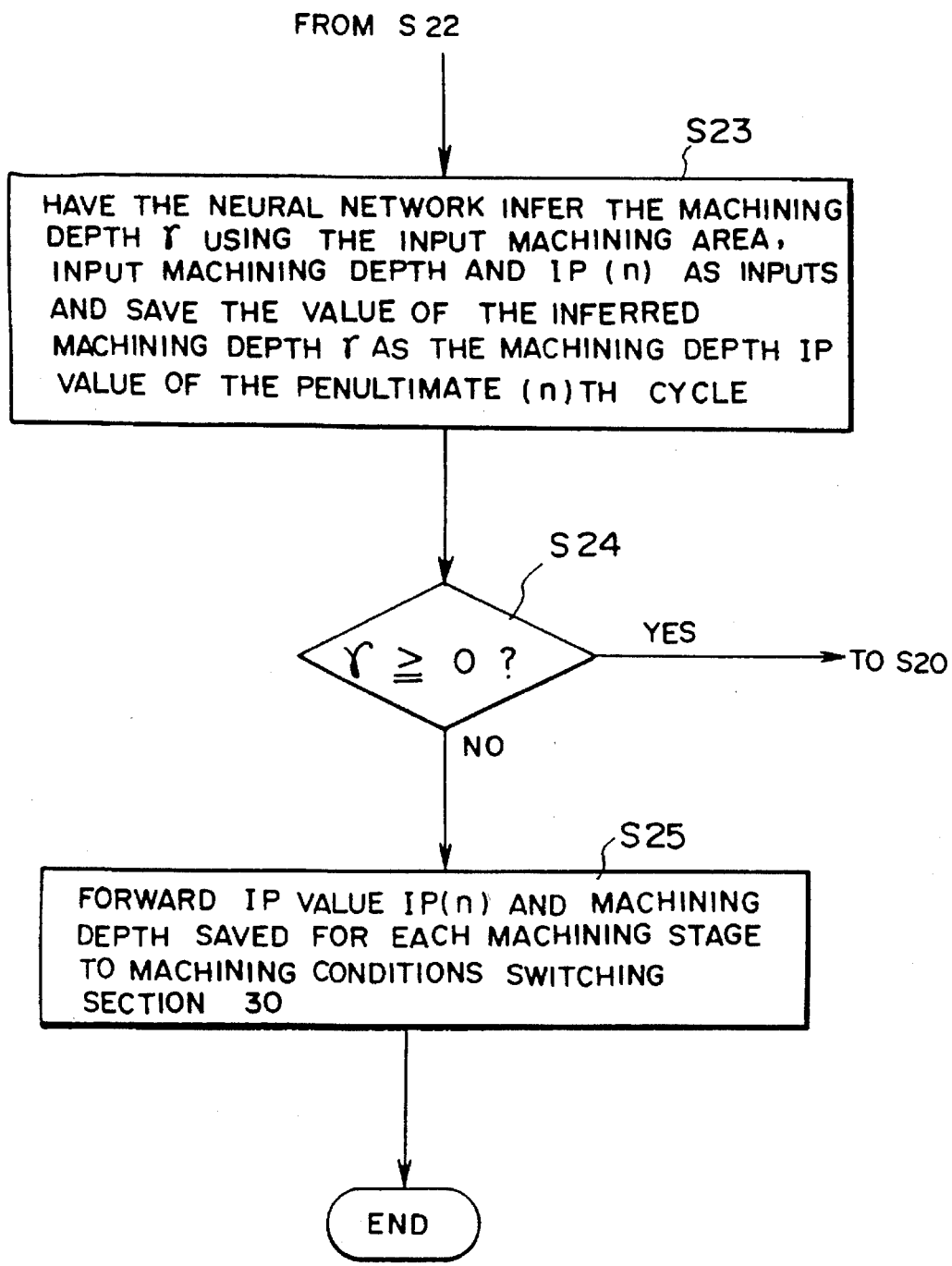

The configuration of an embodiment of the electric discharge machining controller according to the invention is shown in FIG. 1. The electric discharge machining controller, denoted by reference numeral 1 in FIG. 1, controls electric discharge machining conditions for machining a workpiece. In this embodiment, the machining controller 1 determines optimum electric discharge machining conditions for conducting the roughing operations in a relatively short period of time and controls the electric discharge machining in accordance with the determined electric discharge machining conditions.

In FIG. 1, reference numeral 10 indicates an input section such as a keyboard for inputting predefined machining parameter data ID corresponding to the predefined machining parameters required for determining the electric discharge machining conditions. The predefined machining parameters include parameters such as the electrode material, workpiece material, machining area, machining depth, electrode gradient, and electrode undersize.

The electric discharge machining controller 1 further includes a roughing conditions inference section 20 as its main section. The roughing conditions inference system section 20 preferably comprises a microcomputer system. The roughing conditions inference section 20 includes a roughing conditions learning and inference control section 21 which controls the processing for the inference and generation of roughing conditions, a basic data memory 23 in which multiple sets of basic machining condition data are stored in advance, and a vicinal (local) data access section 22 for accessing the basic data memory 23 for obtaining the data most closely related to the predefined machining parameter data ID stored in the basic data memory 23.

The basic data memory 23 stores multiple sets of basic machining condition data in multiple files of a prescribed format. Specifically, the basic data memory 23 preferably stores sets of basic data like those shown in FIGS. 3 and 4.

These are, however, only examples of the basic data files stored in the basic data memory 23, which actually stores numerous files containing typical basic data, categorized according to the combination of electrode material and workpiece material (e.g., graphite electrode and ferrous workpiece, copper electrode and ferrous workpiece, etc.) and, within each such combination of materials, according to the size of the machining area. FIGS. 3 and 4 show examples of two basic files for storing basic data for using a copper electrode to machine a ferrous workpiece over machining areas of 50 mm$^2$ and 100 mm$^2$, respectively. Although the typical basic data stored in the basic files is discontinuous, the electric discharge machining controller 1 is able to generate continuous optimum electric discharge machining conditions based on the typical basic data. This feature of the invention makes it unnecessary to collect and store a large volume of basic data.

In the figures, IP indicates a machining current represented in units of, for example, 1.5 A. (A value of 5 indicates a machining current of 7.5 A, for example.) With an appropriately designed power supply, however, it may be possible to achieve higher efficiency by varying the machining current in smaller steps, such, for example, as in increments of 0.5 A.

The side surface remainder refers to the thickness (in μm) of the stock required to be left for final finishing (1 μ Rmax) when rough machining is conducted at the corresponding IP value.

FIGS. 3 and 4 indicate the side surface remainder required at each IP value when finishing is conducted to a final finish of 1 μRmax. If the required surface roughness of the final finishing is greater than 1 μRmax (e.g. 5 μRmax), however, the side surface remainder can be corrected by the difference between the amounts required at 5 μRmax and 1 μRmax.

The side surface remainder is similar to the remainder at the bottom surface, except that it is the stock allowance required to be left for finishing in the lateral direction rather than in the vertical direction.

The minimum side surface undersize values indicate the electrode undersize required for machining at the corresponding IP values and machining depth. Those values are determined taking into account the fact that the maximum electric discharge machining overcut at a given IP value increases with machining depth because the machining deformation caused by secondary discharges increases with increasing machining depth. FIGS. 3 and 4 show the relationship between depth and minimum side surface undersize. In other words, each minimum side surface undersize value indicates the electrode undersize in terms of the minimum side surface undersize required when finish machining is to be conducted to a prescribed surface roughness after roughing has been conducted to a given depth at a given IP value. The establishment of the minimum side surface undersize is necessary because when machining is conducted at a given IP value, the secondary discharges produce machining deformation into the stock beyond the prescribed overcut (the total of the overcut and the machining deformation being referred to as the maximum overcut). The minimum side surface undersize is thus the sum of the maximum overcut and the overcut in electric discharge machining under finish machining conditions. As a result, the minimum side surface undersize is equal to the sum of the relative movement between the electrode and the workpiece and the electric discharge oversize in the final finishing step for finishing the machined surface using the same electrode.

The roughing conditions inference section 20 further includes a numerical correction section 24 which receives information regarding the electrode undersize and the electrode gradient through the roughing conditions learning and inference control section 21 and corrects the electrode undersize in accordance with the electrode gradient; a temporary memory 26 for temporarily storing the vicinal data accessed by the vicinal data access section 22 for use in learning and inference; and a machining conditions inference section 25 operating under the control of the roughing conditions learning and inference control section 21 for conducting learning and inference operations based on the vicinal data stored in the temporary memory 26 to thereby generate a series of data streams indicating the relationship between the roughing conditions and the machining feed depth. The series of data streams are stored in the temporary memory 26.

The vicinal data access section 22 receives the predefined machining data, including the data representing the electrode material, workpiece material, machining area and machining depth forwarded through the roughing conditions learning and inference control section 21, and the electrode undersize data forwarded through the numerical correction section 24. The vicinal data received by the vicinal data access section 22 from the basic data memory 23 includes at least two sets of basic machining condition data closely related to the input predefined machining parameter data, and each set of basic machining condition data preferably includes data relating to the machining area, minimum electrode undersize, machining depth, maximum machining current and the like. Data SBD, which comprises the accessed data and the input data, is transferred to the temporary memory 26. At least two sets of basic data accessed by the vicinal data access section 22 are used for the learning operation in the machining conditions inference section 25 to form the necessary neural network.

If a tapered electrode having a gradient is used, the electrode undersize data is not used as an input but is corrected by the numerical correction section 24 to data for machining with a straight electrode. As input values, the numerical correction section 24 receives the electrode undersize X and the electrode gradient θ. If the electrode does not have a gradient, the electrode undersize X is forwarded to the vicinal data access section 22 without modification. If it has, for example, a straight gradient, it is forwarded to the vicinal data access section 22 after being converted to X cos θ.

The operation of the vicinal data access section 22 will now be explained.

An example of a preferable method for accessing vicinal data by the vicinal data access section 22 is as follows:

(a) Vicinal data pertinent in light of the machining area concerned is called up from among the group of files relating to the subject electrode material and workpiece material. Vicinal data pertinent in light of the machining area concerned means the two files (or sets of data) in the file group which have machining area values nearest to the machining area value of interest. The nearest machining area values obtained in this manner are referred to as the vicinal machining area values.

(b) Vicinal data, pertinent in light of the machining depth of interest, is retrieved from the two files called up in (a). As used above, the term vicinal data pertinent in light of machining depth of interest means the two machining depth values contained in the two files which are nearest to the machining depth value concerned. The nearest machining depth values obtained in this manner are referred to as the vicinal machining depth values.

(c) For each machining depth value retrieved in (b), the vicinal IP values corresponding to the two minimum side surface undersizes nearest the electrode undersize of interest are retrieved. The minimum side surface undersize values corresponding to the retrieved vicinal IP values are the vicinal minimum side surface undersize values.

(d) In accordance with the foregoing procedure, the data required for learning operations is secured by obtaining at least two sets of vicinal data each consisting of a vicinal machining area value, a vicinal machining depth value, a vicinal minimum side surface undersize value and a vicinal IP value.

The table below shows an example in which the predefined machining data is as follows:

electrode: copper workpiece: iron alloy machining area: 70 mm$^2$ machining depth: 15 mm and the foregoing procedure was used to obtain eight sets of vicinal data by selecting four sets from each of the files shown in FIGS. 3 and 4.

| Vicinal machining area value | Vicinal machining depth value | Vicinal minimum side surface undersize | Vicinal IP value |
| --- | --- | --- | --- |
| 50 | 10 | 480 | 20 |
| 50 | 20 | 590 | 20 |
| 50 | 10 | 420 | 15 |
| 50 | 20 | 510 | 15 |
| 100 | 10 | 500 | 20 |
| 100 | 20 | 570 | 20 |
| 100 | 10 | 400 | 15 |
| 100 | 20 | 480 | 15 |

Since a minimum of two sets of vicinal data suffices for the learning operations, however, it is possible to select two sets of vicinal data from the eight sets or to select a desired two sets of data as the vicinal data from among the machining condition files relating to a copper electrode and an iron alloy workpiece.

The machining conditions inference section 25 is a learning and inference section preferably comprising a neural network. FIGS. 5 to 10 show the inputs and outputs during learning and inference operations. In the flow chart of FIG. 2A to 2F discussed below, steps S14 and S15 correspond to FIGS. 5 and 6, steps S18 and S19 to FIGS. 7 and 8, and steps S22 and S23 to FIGS. 9 and 10.

The temporary memory 26 is for temporarily storing data while the machining conditions inference section 25 is learning the vicinal data or conducting inference.

The roughing conditions inference section 20 preferably comprises a microcomputer which operates and conducts processing in accordance with the flow chart of FIGS. 2A to 2F. The roughing conditions learning and inference control section 21 controls the machining conditions inference section 25 for conducting, in a prescribed order, the operations of calling up vicinal data from the temporary memory 26 and learning the same, deriving desired inference values from the actual input values, and transferring the data representing the inference results through the temporary memory 26 to a machining conditions switching section 30.

The machining conditions switching section 30 receives data OD from the temporary memory 26 of the roughing conditions inference section 20. The data OD represents the machining conditions and the machining depth and comprises the inference results obtained from the machining conditions inference section 25. The machining conditions switching section 30 also receives a machining depth signal DS indicating the actual machining depth, i.e., at each moment, from a position detector 31. In response to the data OD and the machining depth signal DS, the machining conditions switching section 30 sends an electric discharge machining unit (not shown) a signal PC for selecting the electric discharge machining conditions which, in accordance with the data OD, will cause electric discharge machining under roughing conditions to be matched to the actual machining depth, i.e., at each moment. (As arrangements for automatically selecting appropriate machining conditions (from moment to moment) as machining progresses are well known to those of ordinary skill in the art, the present specification need not be burdened with a specific description or illustration of such an arrangement.)

The data OD, comprising the machining conditions and machining depth obtained as the inference results in the machining conditions inference section 25 and stored in the temporary memory 26 may, if desired, be displayed on an appropriate display device. It is also possible to write a machining program based on the data OD. Specifically, instead of controlling the electric discharge machine unit directly in accordance with the data OD, it is possible to prepare a machining program using the data OD representing the relationship between the machining conditions and the machining depth before starting the machining operations and then operating the electric discharge machining unit according to the program during machining.

The operation of the roughing conditions inference section 20 will now be explained with reference to FIGS. 2A to 2F.

In step S10, the input data ID from the input section 10 is sent to the roughing conditions learning and inference control section 21.

Next, in step S11, the roughing conditions learning and inference control section 21 determines whether or not the electrode has a gradient. If the result is affirmative, the electrode undersize data is corrected in step S11a and the corrected electrode undersize is used in the steps that follow.

In step S12, two data files pertinent in light of machining area are retrieved from the group of files with matching electrode and workpiece materials (for example, using the basic data memory 22 and the vicinal data access section 22).

In step S13, vicinal data comprising a vicinal machining area value, a vicinal electrode undersize value, a vicinal machining depth value and a vicinal maximum machining current (vicinal IP) value are retrieved from the data files called up in the step S12 (for example, using the vicinal data access section 22) and stored (for example, using the temporary memory 26). The method for selecting the vicinal data is explained above.

Figure 5:
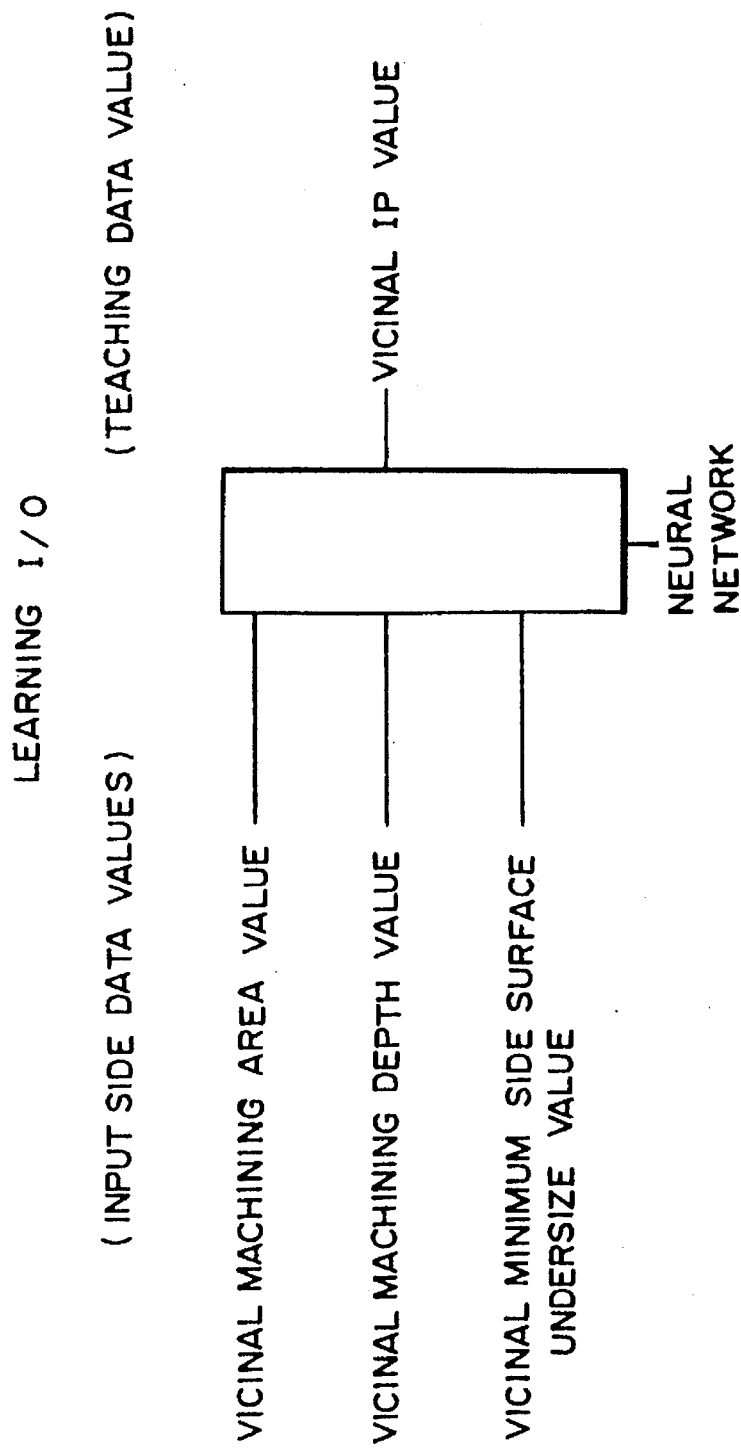
FIG. 5 is a diagram illustrating the learning conducted in a machining conditions inference section of the controller of FIG. 1 to obtain a neural network for inferring the electric discharge machining current value.

In step S14, the retrieved vicinal data is used in the learning operation for forming the neural network illustrated in FIG. 5 and each relationship is defined as a function (for example, using the machining conditions inference section 25).

Figure 6:
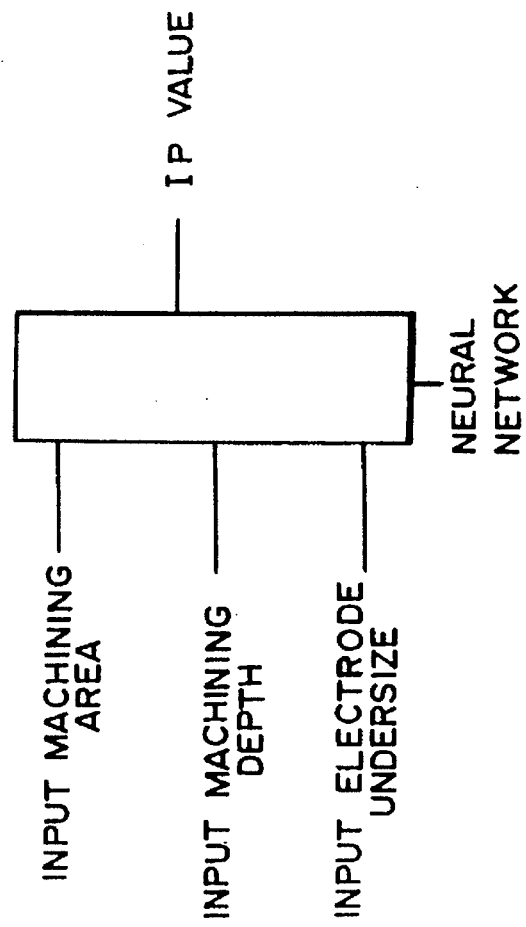
FIG. 6 is a diagram illustrating the inference conducted in a machining conditions inference section of the controller of FIG. 1 to infer the electric discharge machining current value by the use of the neural network obtained by the learning discussed with reference to FIG. 5.

In step S15, the neural network according to the learning results obtained in the step S14 is used, as shown in FIG. 6, for inferring the IP value of the final roughing conditions at the time the desired machining depth is reached based on the input machining area, electrode undersize (corrected value) and machining depth (for example, using the machining conditions inference section 25). However, the IP value obtained in this manner is not generally an integral value and therefore may not be useable to set the maximum machining current in the electric discharge machining unit. Therefore, as the IP value IP(1) used in the final stage of the roughing, is the one, selected from among those usable for setting the maximum current in the electric discharge machining unit, which is closest to, but not larger than, the inferred IP value. The IP value IP(1) determined in this manner is denoted as $\alpha$ herein.

In step S16, IP(1) (the IP value used in the final step) is stored in memory as $\alpha$.

In step S17, the data files called up in step S12 (for example, from the temporary memory 26) are examined and the IP value closest to the IP value a determined in the foregoing manner is retrieved, whereafter data in the vicinity of the input electrode undersize and machining depth are retrieved from the basic machining data corresponding to the retrieved vicinal IP value (for example, using the roughing conditions learning and inference control section 21). In a manner similar to that explained earlier with reference to step S13, at least two sets of vicinal data are obtained in this manner since a minimum of two sets is required for the learning operation illustrated in FIG. 7. The vicinal data of each set comprises of a vicinal machining area value, a vicinal $\alpha$ value, a vicinal machining depth value and a minimum side surface undersize value corresponding to these values.

Figure 7:
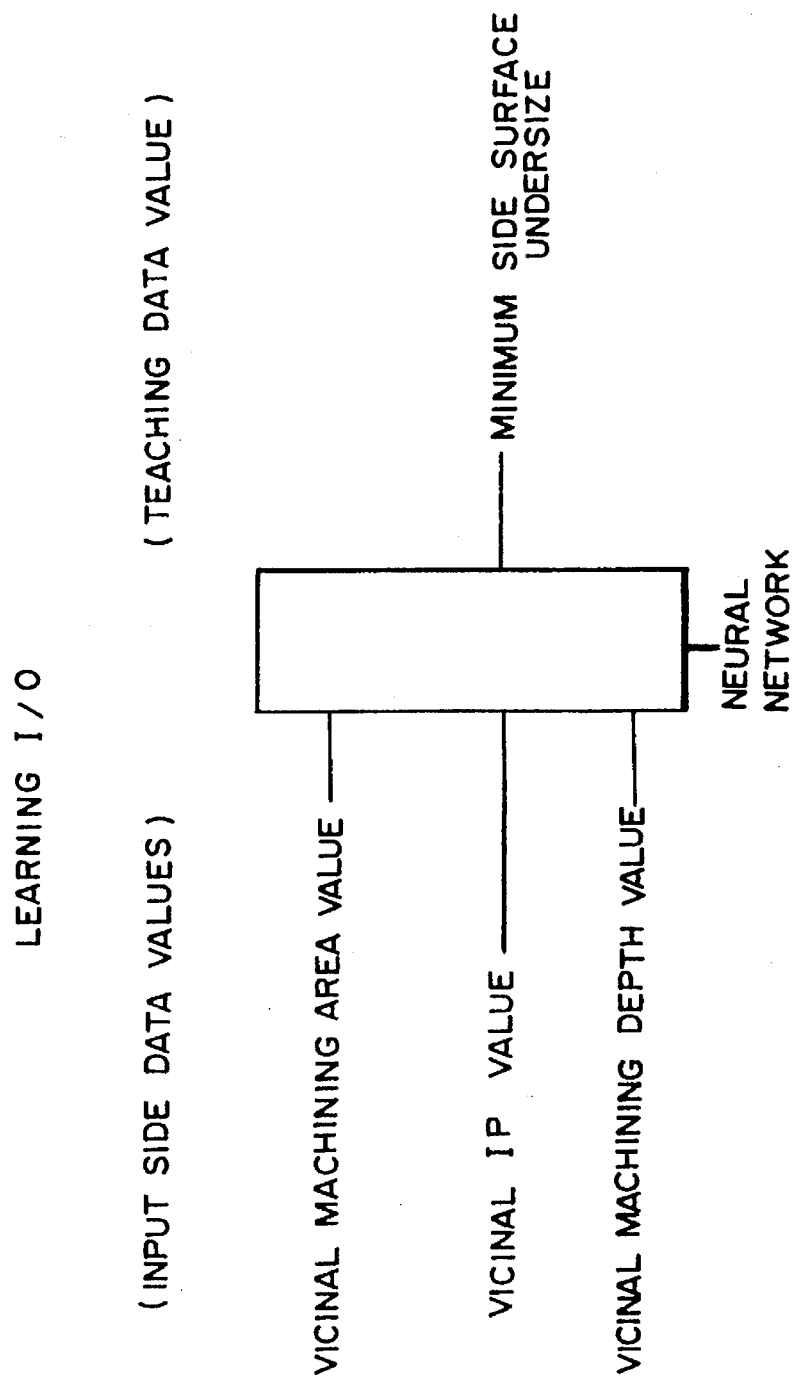
FIG. 7 is a diagram illustrating the learning conducted in a machining conditions inference section of the controller of FIG. 1 to obtain a neural network for inferring the minimum side surface undersized.

In step S18, the vicinal data obtained in the step S17 is used in a manner to that illustrated in FIG. 5 to conduct the learning operation for forming the neural network shown in FIG. 7 (for example, using the machining conditions inference section 25).

Figure 8:
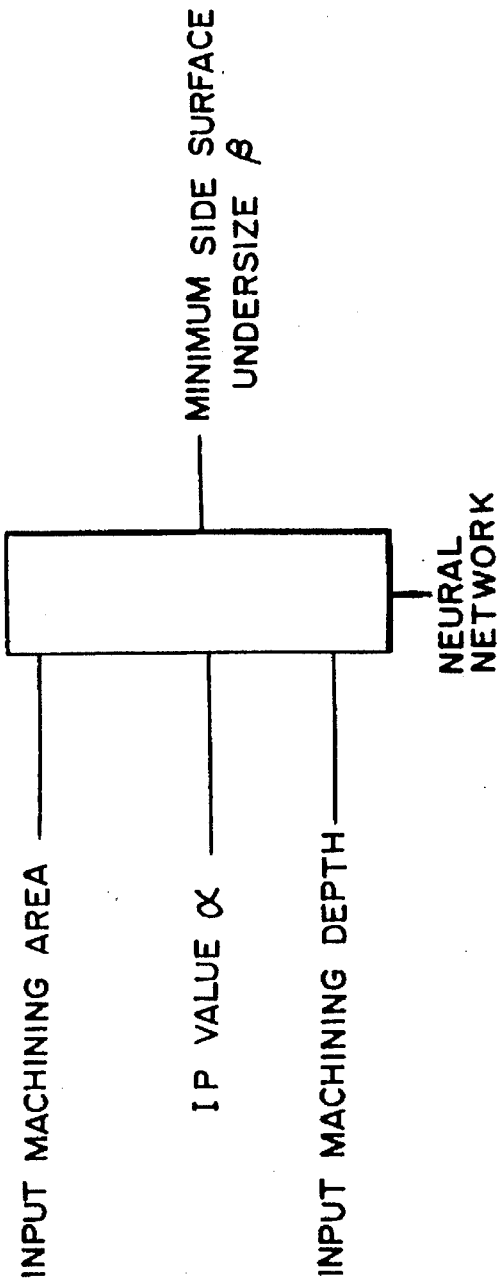
FIG. 8 is a diagram illustrating the inference conducted in a machining conditions inference section of the controller of FIG. 1 to infer the minimum side surface undersize by the use of the neural network obtained by the learning discussed with reference to FIG. 7.

In step S19, IP value $\alpha$ and the machining area and depth indicated in the predefined machining parameters are used as inference input data to conduct the inference operation as illustrated in FIG. 8 for inferring the minimum side surface undersize $\beta$ when machining is conducted at the IP value $\alpha$ actually set in the electric discharge machining unit.

In step S20, the IP value to be used in the penultimate roughing step (n=2) immediately preceding the final step (n=1), namely IP(2), is set to $\alpha+1$ in the same manner as in step S13 (for example, using the roughing conditions learning and inference control section 21).

In step S21, electrode undersize data and machining depth data in the vicinity of the minimum side surface undersize $\beta$ are retrieved from the set of vicinal data in the vicinity of IP value $\alpha+1$ (for example, using the basic data memory 23, the vicinal data retrieval access section 22 and the temporary memory 26).

Figure 9:
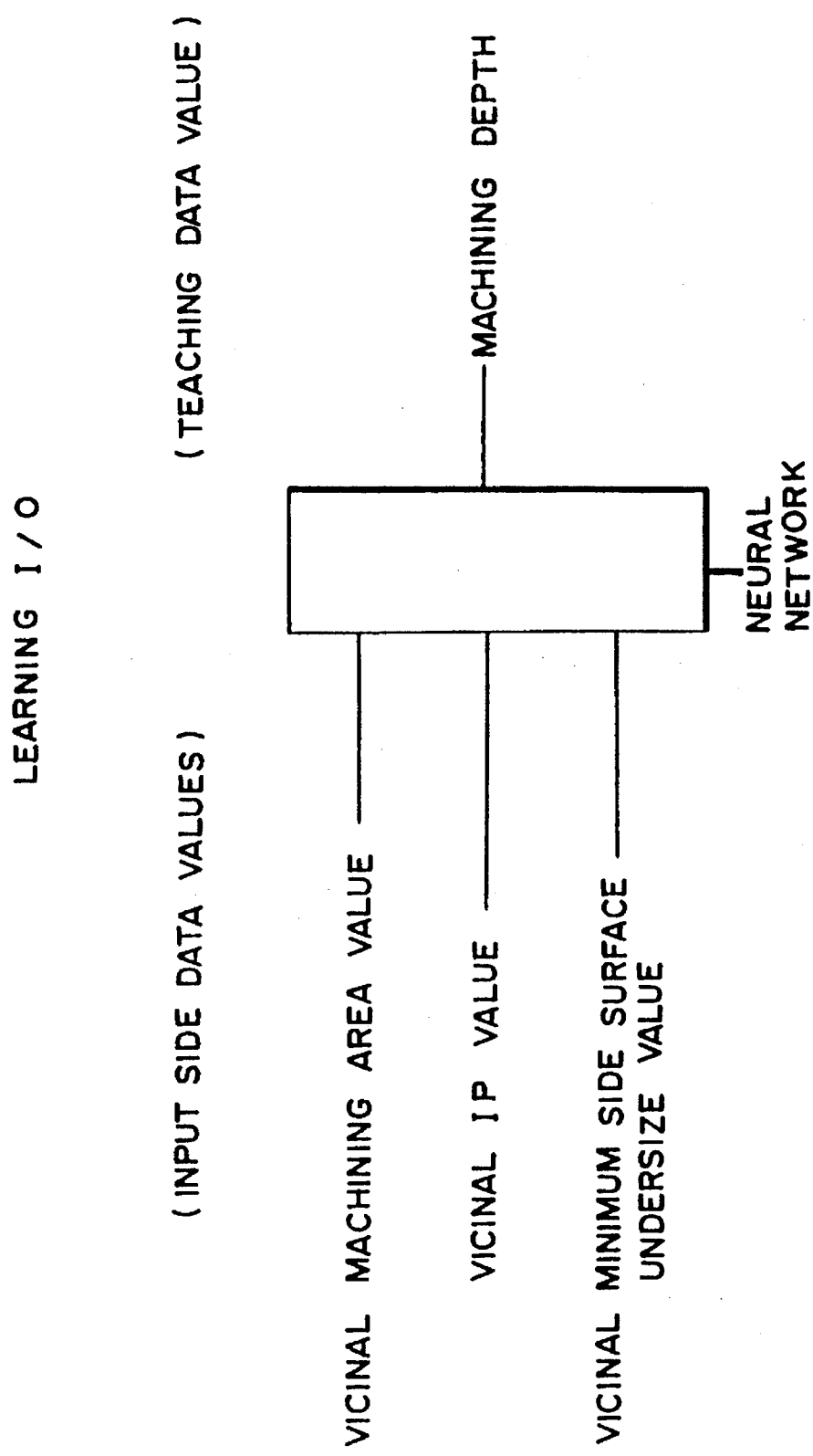
FIG. 9 is a diagram illustrating the learning conducted in a machining conditions inference section of the controller of FIG. 1 to obtain a neural network for inferring machining depth.

In step S22, at least two sets of the vicinal data obtained in the step S21, each comprising a vicinal machining area value, a vicinal IP value, a vicinal minimum side surface undersize value and the vicinal machining depth value, are used for the learning operation illustrated in FIG. 9. As a result, each relationship is defined as a function and the neural network for use in inference is formed.

Figure 10:
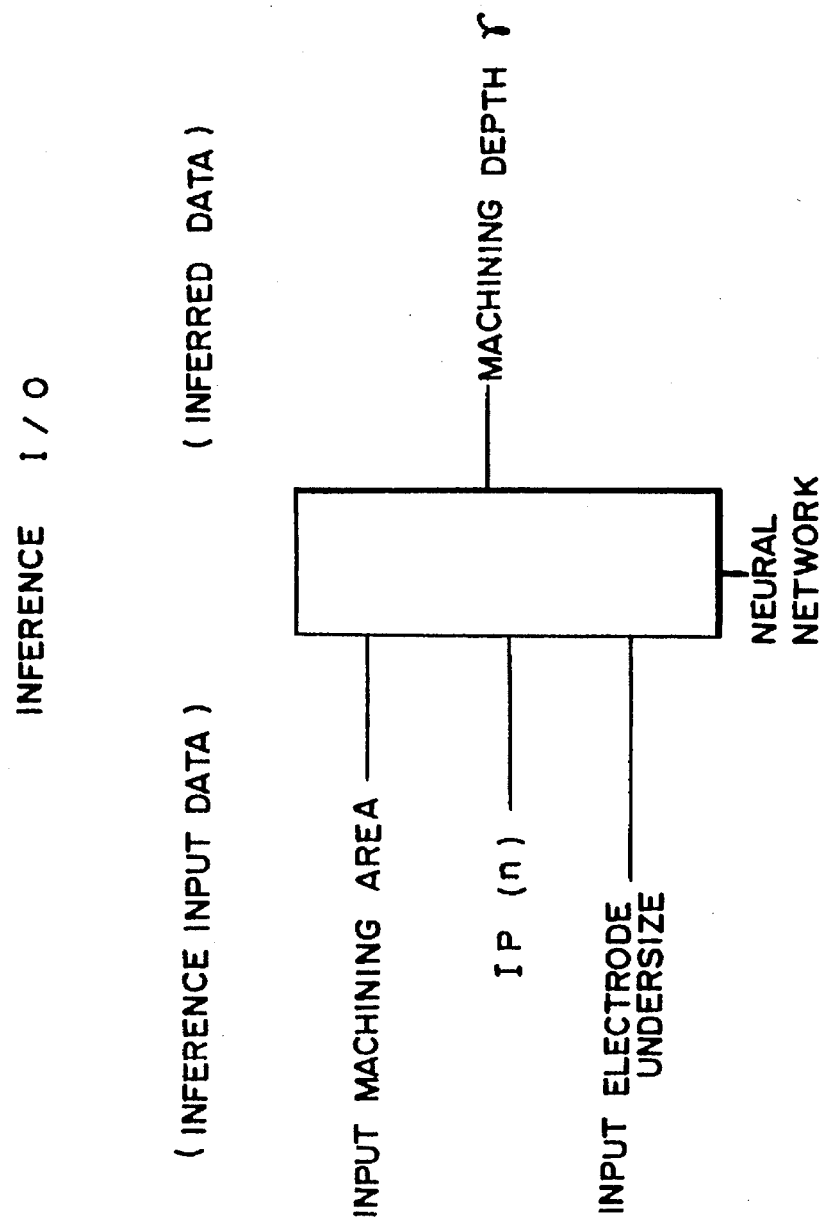
FIG. 10 is a diagram illustrating the inference conducted in a machining conditions inference section of the controller of FIG. 1 to infer the machining depth by the use of the neural network obtained by the learning discussed with reference to FIG. 9.

In step S23, the results of the learning obtained in the step S22 is used in the manner illustrated in FIG. 10 for inferring the machining depth to which machining is possible under the machining conditions when the IP value is set to $\alpha+1$. The IP value $\alpha+1$ and the machining depth inferred at this time are stored in memory as the conditions one stage before the final conditions (for example, using the temporary memory 26 and the machining conditions inference section 25).

In step S24, a check is made to determine whether the machining depth $\gamma$ obtained as this time is greater than 0. If it is, the above procedure is repeated starting from step S20 after increasing IP by 1 to α+2. The learning and inference processing is conducted in the same manner as in the case of α+1. The IP value α+2 and the machining depth inferred at this time are stored in memory as the conditions two stages before the final conditions. The learning and inference processing shown in FIGS. 9 and 10 respectively is similarly repeated for determining the machining depths corresponding to IP values of α+3, α+4, . . . until the machining depth becomes zero or less. The data sets comprising the IP values and corresponding machining depth values obtained in this manner are stored in memory as the conditions three stage, four stage, etc., before the final conditions.

When the depth inferred in this manner becomes equal to or less than 0, the IP values and the corresponding machining depths obtained for the stages up to that point are sent to the machining conditions switching section 30 (for example, from the temporary memory 26 under the general control of the roughing conditions learning and inference control section 21).

As described in the foregoing, in accordance with the present invention, machining conditions which enable the electric discharge machining equipment to utilize its full capacity in conducting the electric discharge machining of the workpiece are inferred and learned and machining is automatically conducted according to the inferred machining conditions. As a result, the invention achieves a dramatic improvement in the efficiency of electric discharge machining by shortening the machining time, particularly the time required to complete roughing operations, thus overcoming one of the main shortcomings of this type of machining.

What is claimed is:

1. A method of determining electric discharge machining conditions in a machining gap formed between an electrode and a workpiece based on a set of predefined machining parameters including machining area, electrode undersize, machining depth, electrode material and workpiece material, the method comprising the steps of:

establishing multiple sets of predefined machining parameters;

establishing, for each set of predefined machining parameters, a set of basic machining data indicative of relationships among electric discharge machining current, machining depth and minimum electrode side surface undersize during electric discharge machining;

selecting at least two sets of basic machining data from among the multiple sets thereof in accordance with a given set of predefined machining parameters; and inferring and generating machining condition data representing a series of pairs of machining depth values and corresponding electric discharge machining current values required for machining the workpiece to a prescribed configuration and dimensions, the electric discharge machining current values in the series progressively changing with increasing machining depth value from a maximum permissible value consistent with the set electrode side surface undersize to a smaller value consistent with the set machining depth.

2. The method according to claim 1, wherein said inferring and generating step comprises:

a first step of forming a first neural network for inferring an electric discharge machining current value on the basis of the sets of basic machining data obtained in the selecting step;

a second step of inferring and determining an electric machining discharge current value for use in a final machining step in accordance with the first neural network by the use of the given set of predefined machining parameters;

a third step of inferring a minimum side surface undersize on the basis of vicinal dam concerning the electric discharge machining current value determined in the second step; and a fourth step of inferring a machining depth for an electric discharge machining current value for use in a machining step prior to the final machining step by use of the given set of predefined machining parameters.

3. A method as set forth in claim 2, further comprising iteratively repeating the fourth step in order to increase the electric discharge current value as a function of decreasing machining depth until the resulting machining depth is equal to or larger than zero to thereby obtain the series of pairs of machining depth values and corresponding electric discharge machining current values.

4. A method as set forth in claim 2, further comprising the step of forming the first neural network by a learning operation in which a vicinal machining area value, vicinal machining depth value and vicinal minimum side surface undersize value are used as input side data and a vicinal electric discharge machining current value is used as teaching data.

5. The method according to claim 4, wherein a further electric discharge machining current value is inferred by the first neural network using the given predefined machining parameters and the electric discharge machining current value inferred for use in the final machining step.

6. A method as set forth in claim 2, wherein the third step further comprises inferring the minimum side surface undersize by means of a second neural network.

7. A method as set forth in claim 6, further comprising the step of forming the second neural network by a learning operation in which a vicinal machining area value, vicinal machining depth value and vicinal electric discharge machining current value are used as input side data and a minimum side surface undersize value is used as teaching data.

8. A method as set forth in claim 2, wherein the fourth step further comprises inferring machining depth by means of a third neural network.

9. A method as set forth in claim 8, further comprising the step of forming the third neural network by a learning operation in which a vicinal machining area value, vicinal electric discharge machining current value and vicinal minimum side surface undersize value are used as input side data and a machining depth value is used as a teaching data.

10. An electric discharge machining controller for controlling electric discharge machining conditions in a machining gap formed between an electrode and a workpiece during electric discharge machining of the workpiece, based on a set of predefined machining parameters including machining area, electrode undersize, machining depth, electrode material and workpiece material, said controller comprising:

means for inputting desired predefined machining parameters;

means for storing data files for different electrode materials, workpiece materials and machining areas, each data file including multiple sets of basic machining data indicative of relationships among electric discharge machining current, machining depth and minimum electrode side surface undersize during electric discharge machining;

means responsive to the predefined machining parameters for selecting vicinal data closely related to the given predefined machining parameters from among the multiple sets of basic machining data in the means for storing;

means for inferring and generating machining condition data representing a series of pairs of machining depth values and corresponding electric discharge machining current values required for machining the workpiece to a prescribed configuration and dimensions, the electric discharge machining current values in the series of pairs of values progressively changing with increasing machining depth value from a maximum permissible value consistent with the set electrode side surface undersize to a smaller value consistent with the set machining depth;

means for detecting actual machining depth value; and means responsive to the detecting means and machining condition data obtained in the inferring and generating step for changing the electric discharge machining current value in accordance with an increase in the actual machining depth.

11. An electric discharge machining controller for controlling electric discharge machining conditions in a machining gap formed between an electrode and a workpiece during electric discharge machining of the workpiece based on a set of predefined machining parameters including machining area, electrode undersize, machining depth, electrode material and workpiece material, said controller comprising:

means for inputting desired predefined machining parameters;

means for storing data files for different electrode materials, workpiece materials and machining areas, each data file including multiple sets of basic machining indicative of relationships among electric discharge machining current, machining depth and minimum electrode side surface undersize during electric discharge machining;

a first selecting means responsive to the predefined machining parameters for selecting first vicinal data closely related to the given predefined machining parameters from among the multiple sets of basic machining data stored in the storing means;

means for forming a first neural network, on the basis of the first vicinal data, for inferring an electric discharge current value from the given predefined machining parameters;

means for inferring and generating an electric discharge machining current value for use in a final machining step in accordance with the first neural network by use of the predefined machining parameters;

a second selecting means, responsive to the means for inferring and generating an electric discharge machining current value, for selecting second vicinal data closely related to the electric discharge machining current value for the final machining step from among the multiple sets of basic machining data stored in the means for storing;

means for forming a second neural network for inferring a minimum side surface undersize on the basis of the second vicinal data;

means for inferring and generating a minimum side surface undersize value corresponding to the electric discharge machining current value to be used for the final machining step and given predefined machining parameters including machining area and machining depth;

means responsive to the minimum side surface undersize value for generating a series of pairs of machining depth values and corresponding electric discharge machining current values required for machining the workpiece to a prescribed configuration and dimensions, the electric discharge machining current values in the series progressively changing with increasing machining depth value from a maximum permissible value consistent with the set electrode side surface undersize to a smaller value consistent with the set machining depth;

means for detecting actual machining depth; and means responsive to the detecting means, minimum side surface undersize value and corresponding machining current values for changing the electric discharge machining current in accordance with the actual machining depth.

12. A method of determining optimum electric discharge machining conditions in a machining gap formed between an electrode and a workpiece corresponding to a set of predefined machining parameters including machining area, electrode undersize, machining depth, electrode material and workpiece material using data stored in advance in a memory, said data comprising multiple sets of predefined machining parameters, said method comprising the steps of:

establishing multiple sets of basic machining data, each corresponding to a set of predefined machining parameters, each of the sets of basic machining data being indicative of relationships among electric discharge machining current, machining depth and minimum electrode side surface undersize present during electric discharge machining;

selecting at least two sets of basic machining data from among the multiple sets thereof in accordance with a given set of predefined machining parameters, and inferring and generating machining condition data representing a series of pairs of machining depth values and corresponding electric discharge machining current values required for machining the workpiece to a prescribed configuration and dimensions, the electric discharge machining current values in the series progressively changing with increasing machining depth value from a maximum permissible value consistent with the set electrode side surface undersize to a smaller value consistent with the actual machining depth.

13. A method of determining electric discharge machining conditions in a machining gap formed between an electrode and a workpiece on the basis of a set of predefined machining parameters including machining depth and electrode undersize, the method comprising the steps of:

setting a set of predefined machining parameters including machining depth and electrode undersize;

establishing a data file including multiple sets of basic machining dam indicative of relationships among electric discharge machining current, a machining depth and minimum electrode undersize;

selecting at least two sets of basic machining data from among the multiple sets thereof, said at least two sets of basic machining data including data corresponding to or adjacent to the set values of machining depth and electrode undersize; and inferring an electric discharge machining current value on the basis of said at least two sets of basic machining data, the inferred electric discharge machining current value being the maximum permissible to be supplied to the machining gap when machining with electrode having the set electrode undersize at the set machining depth.

14. The method according to claim 13, wherein said step of inferring comprises forming a neural network for inferring said electric discharge machining current value on the basis of said at least two sets of basic machining data.

15. A method of determining electric discharge machining conditions in a machining gap formed between an electrode and a workpiece on the basis of a set of predefined machining parameters including machining depth, electrode undersize and machining area, the method comprising the steps of:

setting a set of predefined machining parameters including machining depth, electrode undersize and machining area;

establishing multiple data files for different machining areas, each of said data files including multiple sets of basic machining data being indicative of relationships among electric discharge machining current, machining depth and minimum electrode undersize;

selecting at least one data file from among multiple data files in accordance with the set machining area;

selecting at least two sets of basic machining data from among the multiple sets thereof in the selected data file, said at least two sets of basic machining data including data corresponding to or adjacent to the set values of machining depth and electrode undersize; and inferring electric discharge machining current on the basis of said at least two sets of basic machining data.

16. A method of determining electric discharge machining conditions in a machining gap formed between an electrode and a workpiece on the basis of a set of predefined machining parameters including machining depth and electrode undersize, the method comprising the steps of:

establishing a data file including multiple sets of basic machining data indicative of relationships among electric discharge machining current, machining depth and minimum electrode undersize;

determining a first value of electric discharge machining current, a first value of machining depth and electrode undersize;

selecting at least two sets of basic machining data from among the multiple sets thereof, said at least two sets of basic machining data including data corresponding to or adjacent to the electrode undersize and a second value of electric discharge machining current which is larger than said first value thereof; and inferring a second value of machining depth on the basis of said at least two sets of basic machining data, said electric discharge machining current being changed from said second value to said first value thereof when machining depth reaches said second value thereof which is smaller than said first value thereof during machining.

17. An electric discharge machining controller for controlling electric discharge machining conditions in a machining gap formed between an electrode and a workpiece based on a set of predefined machining parameters including machining depth and electrode undersize, said controller comprising:

means for setting a set of predefined machining parameters including machining depth and electrode undersize;

a memory for storing data files including multiple sets of basic machining data indicative of relationships among electric discharge machining current machining depth and minimum electrode undersize;

selecting means for selecting at least two sets of basic machining data from among the multiple sets thereof, said at least two sets of basic machining data including data corresponding to or adjacent to the set values of machining depth and electrode undersize; and means for inferring electric discharge machining current value on the basis of said at least two sets of basic machining data.

18. The electric discharge machining controller according to claim 17, wherein said means for inferring comprises a neural network, and wherein said at least two sets of basic machining data are supplied to an input side of said neural network as teaching data.

* * * * *

UNITED STATES PATENT AND TRADEMARK OFFICE
CERTIFICATE OF CORRECTION

PATENT NO. : 5,571,426
DATED : November 5, 1996
INVENTOR(S) : S. Akemura et al.

It is certified that error appears in the above-indentified patent and that said Letters Patent is hereby corrected as shown below:

Col. 10/ln. 4   delete the word "dam" and insert --data--

Signed and Sealed this

Twenty-sixth Day of August, 1997

Attest:

BRUCE LEHMAN

Attesting Officer      *Commissioner of Patents and Trademarks*